Patented Aug. 21, 1951

2,564,925

UNITED STATES PATENT OFFICE 2,564,925

STABILIZED HIGH SOLIDS MELAMINE FORMALDEHYDE RESIN SOLUTIONS

John Davis Pollard, Baltimore, Md., assignor to American Cyanamid Company, New York, N. Y., a corporation of Maine No Drawing. Application January 25, 1949, Serial No. 72,748

3 Claims. (Cl. 260—29.4)

This invention relates to a process for stabilizing resin solutions against rapid gelation, and more particularly, to a process for stabilizing acidic aqueous colloidal solutions of melamine formaldehyde resin having a high solid content of the resin in solution.

As a general rule, the stability of these aqueous colloidal solutions varies inversely with the amount of resin in the solution. It is often desirable to have a high solid content of the resin in a given solution but the rapid development of gelation makes these high solid resin solutions impractical for general use. These high solid colloidal resin solutions would have a greater utility and a broader applicability when stabilized because of the increased life they experience in a colloidal state before reaching the stage of a non-dispersible gel. When I refer to a high solid content of melamine formaldehyde resin in solution, I mean a concentration varying between about 12% and 40% by weight of the resin based on the total weight of the solution. These amounts of resin in a high solids solution may be somewhat greater or less than the percentage shown above.

The object of this invention is to produce stable colloid solutions having a high solid content of a partially polymerized melamine formaldehyde resin by adding varying amounts of urea depending upon the degree of stability desired, and depending upon the amount of the solid resin present in the solution.

A further object of this invention is to use these stabilized aqueous colloidal resin solutions to treat regenerated cellulose films (cellophane) and other cellulosic materials, paper, and various textile materials. These stabilized high solid resin solutions when used to treat regenerated cellulose films and fabrics would serve as bonding agents to improve the anchoring of the subsequently applied topcoat. These resin solutions can be further utilized for paper treatment either in the pulp and fibre form such as in the beater addition processes or as an impregnant to the finished paper sheeting. Melamine formaldehyde hydrochloride solutions are useful for this purpose but since these cellulosic materials, and particularly regenerated cellulose films and fabrics, are very sensitive to mineral acids, the use of comparatively low concentrations of organic acids in melamine formaldehyde resin solutions was considered a desirable improvement. In my U. S. Patent No. 2,417,014 issued March 4, 1947, I have described my process for preparing acidic solutions of a partially polymerized melamine formaldehyde condensation product in an aqueous aliphatic polyhydric alcohol solvent. In that process, I have utilized the polyhydric alcohols in an acidic aqueous medium to produce colloidal solutions of the resin which are dilutable with water before polymerization in solution has reached the stage of a non-dispersible gel. In such solutions, relatively large proportions of di- and poly-hydroxy organic materials (glycerol, ethylene glycol, sucrose, etc.) appear capable of replacing a substantial amount of the water normally used for solubilization, thus enabling the use of very small amounts of acids to produce water-dispersible colloid solutions. However, the melamine formaldehyde hydrochloric acid and melamine formaldehyde organic acid aqueous solutions, when used with resin solids concentrations appreciably higher than 12%, gel very rapidly when allowed to stand even at room temperature. The same is true of low acid aqueous polyhydric alcohol solutions, although gelling resistance is somewhat better than that of all-water solutions of melamine formaldehyde resin.

The use of urea in these solutions proves to be an effective means for increasing stability against gelation even when the solid resin content is considerably higher than 12%. A few examples would serve to further illustrate this point.

EXAMPLE 1

(a) A mixture of 20 parts by weight partially polymerized, hydrophobic melamine formaldehyde resin, 35 parts by weight urea, 35 parts by weight water, and 10 parts by weight 85% lactic acid was stirred at room temperature until solution was substantially complete. The resulting solution was dilutable with water to less than 1% melamine formaldehyde solids, and the 20% resin solids solution remained fluid for over one month when allowed to stand at room temperature.

(b) A similar mixture, in which an equal weight of water was substituted for the urea, formed a solid, non-dispersible gel within 2 hours after preparation.

EXAMPLE 2

(a) A mixture of 19 parts by weight water-soluble methylated trimethylol melamine, 20 parts by weight urea, 56 parts by weight water and 5 parts by weight 85% lactic acid was stirred at room temperature until a substantially clear solution was produced. This solution remained fluid and water-dispersible for over 15 days when stored at room temperature.

(b) A similar solution, in which the urea was replaced by an equal weight of water, formed a solid, non-dispersible gel within 1 day after preparation.

EXAMPLE 3

(a) 30 parts by weight of partially polymerized, hydrophobic melamine-formaldehyde resin, 30 parts by weight urea, 24 parts by weight water and 16 parts by weight 85% lactic acid were stirred at room temperature until substantial solution was achieved. This solution, although viscous, remained sufficiently fluid to allow dilution with water to 1% resin solids concentration after standing at room temperature for over 7 days.

(b) A similar mixture, in which the urea was replaced by an equal weight of water, formed a solid, non-dispersible gel within 1 hour after preparation.

EXAMPLE 4

(a) A mixture comprising 15 parts by weight partially polymerized, hydrophobic melamine formaldehyde resin, 53 parts by weight 60% aqueous ethylene glycol, 30 parts by weight urea and 3 parts by weight 85% lactic acid was stirred at room temperature until a substantially clear solution was obtained. This solution remained fluid and water-dispersible when stored at room temperature for over one month.

(b) A similar solution, in which the urea was replaced by an equal weight of water, formed a solid, non-dispersible gel within 3 days after preparation.

EXAMPLE 5

(a) A mixture of 12 parts by weight partially polymerized, hydrophobic melamine formaldehyde resin, 30 parts by weight urea, 53 parts by weight water and 5 parts by weight 85% lactic acid was stirred at room temperature until solution had taken place. The final solution remained fluid and water-dispersible when stored at room temperature for over 18 days.

(b) A similar solution, in which an equal weight of water replaced the urea, formed a solid, non-dispersible gel within 3 hours after preparation.

EXAMPLE 6

(a) A mixture comprising 60 parts by weight of 25% solids aqueous trimethylol melamine, 30 parts by weight urea, and 10 parts by weight 85% lactic acid was stirred at room temperature to produce a clear solution. The resulting composition remained fluid and water-dispersible when stored at room temperature for over 10 days.

(b) A similar solution, in which the urea was replaced by an equal weight of water, formed a solid, non-dispersible gel within 4 hours after preparation.

It is to be noted that lactic acid has been used in varying amounts as a solubilizing agent in each instance. It is to be further noted that other water soluble organic acids and inorganic mineral acids could be effectively used for the same purpose. A few of the organic acids that could be used are acetic, formic, glycolic, maleic, fumaric, hydroxyisobutric, aminoacetic, propionic and butyric acids. In addition to the hydrochloric, one may use mineral acids such as phosphoric acid and sulfurous.

The use of ethylene glycol and other dihydric and polyhydric alcohols serves to inhibit the formation of cloudiness in the aqueous resin solutions. These polyhydric alcohols further serve to stabilize the collodidal resin solutions against gelation but when used without the addition of urea the stabiilzation period is shortened considerably.

To further illustrate these points the following solutions were prepared which indicate the relative merits of urea and the polyhydric alcohols when used separately or in combination, and for comparison purposes, results of similar tests performed with aqueous resin solutions containing neither urea or polyhydric alcohols. In Table I the aqueous solution of a hydrophobic partially condensed melamine formaldehyde resin is prepared with lactic acid but without urea or a polyhydric alcohol. The M. F. resin used in this table was prepared by using a mol ratio of 1:3 and the resin was spray dried.

Table I

AQUEOUS LACTIC ACID SOLUTIONS OF MELAMINE FORMALDEHYDE RESIN

| Composition of Solution | | | Per Cent Resin Solids | Ratio Mols Resin to Mols Acid | Time Req. to form Solid Gel. |
|---|---|---|---|---|---|
| Melamine-Formaldehyde | H₂O | Lactic Acid¹ | | | |
| Parts by weight | Parts by weight | Parts by weight | | | Hours |
| 12 | 83 | 5 | 12 | 1:0.8 | 3 |
| 12 | 82 | 6 | 12 | 1:1.0 | 4 |
| 12 | 76 | 12 | 12 | 1:2.0 | 36 |
| 12 | 71 | 17 | 12 | 1:3.0 | 96 |
| 20 | 72 | 8 | 20 | 1:0.8 | 1 |
| 20 | 70 | 10 | 20 | 1:1.0 | 1 (PPT) |
| 20 | 60 | 20 | 20 | 1:2.0 | 3 |
| 20 | 51 | 29 | 20 | 1:3.0 | 18 |
| 30 | 58 | 12 | 30 | 1:0.8 | 1 |
| 30 | 55 | 15 | 30 | 1:1.0 | 2 |
| 30 | 41 | 29 | 30 | 1:2.0 | 3 |

¹ 85% lactic acid in aqueous solution.

In Table II the aqueous solution of a hydrophobic partially condensed melamine formaldehyde resin is prepared with lactic acid and urea but without polyhydric alcohols. The M. F. resin used in Table II is prepared in the same manner as that in Table I.

Table II

AQUEOUS UREA SOLUTIONS OF MELAMINE FORMALDEHYDE-LACTIC ACID RESIN COLLOID

| Composition of Solution | | | | Per Cent Resin Solids | Ratio Mols Resin: Mols Acid | Time Req. to Gel at Room Temp. |
|---|---|---|---|---|---|---|
| Melamine Formaldehyde | Urea | H₂O | Lactic Acid¹ | | | |
| Parts by weight | Parts by weight | Parts by weight | Parts by weight | | | Days |
| 12 | 30 | 52 | 6 | 12 | 1:1 | 20 |
| 12 | 35 | 36 | 17 | 12 | 1:3 | 20 |
| 20 | 35 | 35 | 10 | 20 | 1:1 | 20 |
| 20 | 30 | 30 | 20 | 20 | 1:2 | 10 |
| 20 | 30 | 21 | 29 | 20 | 1:3 | 10 |
| 30 | 30 | 25 | 15 | 30 | 1:1 | 10 |

¹ 85% lactic acid in aqueous solution.

In Table III, the aqueous solution of a hydrophobic partially condensed melamine formaldehyde resin is prepared with lactic acid, urea, and polyhydric alcohols. The M. F. resin used in Table III is prepared in the same manner as that used in Table I.

Table III

AQUEOUS UREA-GLYCEROL OR UREA ETHYLENE GLYCOL SOLUTIONS OF HYDROPHOBIC MELAMINE FORMALDEHYDE RESINS AND LACTIC ACID

| Composition of Solution | | | | | | Per Cent Resin Solids | Ratio Mols Resins: Mols Acid | Time Req. to Gel |
|---|---|---|---|---|---|---|---|---|
| Melamine Formaldehyde | Urea | Glycerol | Glycol | H₂O | Lactic Acid [1] | | | |
| Parts by weight | Parts by weight | Parts by weight | Parts by weight | Parts by weight | Parts by weight | | | Days |
| 15 | 0 | 0 | 50 | 33 | 2 | 15 | 1:0.3 | 3 |
| 15 | 20 | 0 | 38 | 25 | 2 | 15 | 1:0.3 | 38 |
| 15 | 30 | 0 | 32 | 21 | 2 | 15 | 1:0.3 | 38 |
| 20 | 0 | 45 | 0 | 29 | 6 | 20 | 1:0.6 | 1 |
| 20 | 40 | 10 | 0 | 24 | 6 | 20 | 1:0.6 | 40 |
| 20 | 40 | 18 | 0 | 16 | 6 | 20 | 1:0.6 | 40 |

[1] 85% lactic acid in aqueous solution.

In Table IV, the stabilization of the water dispersible alkylated melamine formaldehyde resin solutions can be shown by a series of methylated trimethylol melamine resin solutions which are prepared at room temperature the following results are observed. The resin used in Table IV was prepared from M and F in mol ratio 1–3 and the trimethylol melamine formed is methylated.

Table IV

AQUEOUS UREA SOLUTIONS OF METHYLATED TRIMETHYLOL MELAMINE-LACTIC ACID

| Composition of Solution | | | | Per Cent Resin Solids | Ratio Mols Resin: Mols Acid | Time Req. to gel at Room Temp. |
|---|---|---|---|---|---|---|
| Methylated Methylol Melamine [1] | Urea | H₂O | Lactic Acid [2] | | | |
| Parts by weight | Parts by weight | Parts by weight | Parts by weight | | | |
| 19 | 0 | 76 | 5 | 15 | 1:1 | 24 Hours. |
| 19 | 5 | 71 | 5 | 15 | 1:1 | 48 Hours. |
| 19 | 10 | 66 | 5 | 15 | 1:1 | 48 Hours. |
| 19 | 20 | 56 | 5 | 15 | 1:1 | 15 Days. |

[1] 80% solids in aqueous solution.
[2] 85% lactic acid in aqueous solution.

These figures show that when approximately 20 parts by weight of urea is substituted in the aqueous solution for the all-water solvent commonly used, the resulting solution is very much more resistant to gelling.

In Table V, the stabilization of a water soluble trimethylol melamine solution by the addition of urea is shown and comparison is made therewith to similar solutions containing no added urea. The melamine resin used in Table V is prepared from M and F in mol ratio of 1–3 and is tray dried.

Table V

AQUEOUS UREA SOLUTION OF TRIMETHYLOL MELAMINE-LACTIC ACID

| Composition of Solution | | | | Per Cent Resin Solids | Ratio Mols Resin: Mols Acid | Time Req. to Gel |
|---|---|---|---|---|---|---|
| Trimethylol Melamine | Urea | H₂O | Lactic Acid | | | |
| Parts by weight | Parts by weight | Parts by weight | Parts by weight | | | |
| 15 | 0 | 75 | 10 | 15 | 1:1.4 | 4 Hours. |
| 15 | 30 | 45 | 10 | 15 | 1:1.4 | 12 Days. |
| 25 | 0 | 62 | 13 | 25 | 1:1 | 2 Hours. |
| 25 | 35 | 27 | 13 | 25 | 1:1 | 12 Days. |

An examination of the data set forth above indicates some remarkable and effective results when urea is added to methylol melamine solutions.

In addition to the melamine formaldehyde resins and the alkylated melamine formaldehyde resins this stabilizing effect can be produced on melamine-urea-formaldehyde copolymer resins by the inclusion of urea as a component of the final solution.

The minimum amount of urea that should be present in such solutions is governed by the amount of formaldehyde which, in a given solution, is potentially available for reaction with the urea. Such formaldehyde may be present in the free state or combined with the triamino triazine. In actual practice it has been possible to prepare solutions in which the amount of urea may be as high as 50% of the total weight of the solution.

A good range of urea concentrations would be 5–50% of the total weight of the solution, with 20–40% preferred.

In the practice of the process of this invention it is possible to substitute, for the urea, other water-soluble derivatives of urea and substances containing

or

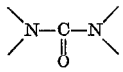

structures such as methyl urea, ethyl urea, propyl urea, butyl urea, dimethyl urea, diethyl urea. A further group of compounds which would be adaptable for this purpose are guanidine, methylguanidine and thiourea.

In addition to using each of these urea-type compounds individually, this invention encompasses the use of any two or more of these compounds in varying combinations and proportions.

It has been previously set forth that the use of polyhydric alcohols in the practice of this process is twofold; i. e., to aid in the stabilization of the colloidal solution and prevent the formation of cloudiness but primarily to enable the use of small proportions of acid. The polyhydric alcohols which could be used in this process include the glycols, ethandiol, the propanediols, the butanediols, etc. The glycerols, amyl glycerol, diethyl glycerol, etc; pentitol and mannitol, etc.

In addition to using these aliphatic di and polyhydric alcohols. It is possible to substitute aromatic di and polyhydric compounds such as resorcinol, orcinol tetrahydroxybenzene, etc.

The amount of polyhydric alcohols which can be used in the practice of the process of this invention may be widely varied but it has been found that a range between 5% and 50% by weight of the total solution can be used but 10–40% by weight of the total solution is preferred. The amount of acid used to solubilize the resins into aqueous solution can be varied considerably depending on the particular acid used but ordinarily only relatively small amounts are necessary. The actual amount of acid present may vary between 2% and 30% by weight of the entire weight of the solution.

I claim:

1. A stabilized, acidic, aqueous, colloidal solution containing between 12% and 40% by weight of melamine formaldehyde resin and between 5% and 50% by weight of urea.

2. A stabilized acidic, aqueous, colloidal solution containing between 12% and 40% by weight of melamine formaldehyde resin and between 20% and 40% by weight of urea.

3. A stabilized acidic, aqueous, colloidal solution containing between 12% and 40% by weight of melamine formaldehyde resin and between 20% and 40% by weight of urea and a quantity of a water-soluble polyhydric alcohol.

JOHN DAVIS POLLARD.

REFERENCES CITED

The following references are of record in the file of this patent:

UNITED STATES PATENTS

| Number | Name | Date |
|---|---|---|
| 2,417,014 | Pollard | Mar. 4, 1947 |
| 2,466,457 | Lynn et al. | Apr. 5, 1949 |